United States Patent
Hsu et al.

(10) Patent No.: US 8,423,753 B2
(45) Date of Patent: *Apr. 16, 2013

(54) SYSTEM AND METHOD FOR EXPRESS EXECUTION OF NAVIGATION FUNCTION

(75) Inventors: Sheng-Kai Hsu, Luodong Township (TW); Hsien-Wen Chang, Taipei (TW)

(73) Assignee: Getac Technology Corporation, Hsinchu (TW)

( * ) Notice: Subject to any disclaimer, the term of this patent is extended or adjusted under 35 U.S.C. 154(b) by 442 days.

This patent is subject to a terminal disclaimer.

(21) Appl. No.: 12/826,558

(22) Filed: Jun. 29, 2010

(65) Prior Publication Data
US 2010/0275004 A1    Oct. 28, 2010

Related U.S. Application Data

(63) Continuation-in-part of application No. 11/230,657, filed on Sep. 21, 2005, now Pat. No. 7,774,586.

(30) Foreign Application Priority Data

Jul. 22, 2005  (TW) ............................... 94125020 A

(51) Int. Cl.
*G06F 9/24*   (2006.01)
*G06F 15/177* (2006.01)

(52) U.S. Cl.
USPC .................. 713/1; 713/2; 713/100; 715/700; 715/739; 715/961

(58) Field of Classification Search ................. 713/1, 2, 713/100; 715/700, 739, 961
See application file for complete search history.

(56) References Cited

U.S. PATENT DOCUMENTS 7,774,586 B2 * 8/2010 Hsu ................................. 713/1
2006/0095756 A1 * 5/2006 Erforth et al. .................... 713/2

* cited by examiner

*Primary Examiner* — Kim Huynh
*Assistant Examiner* — Michael J Brown

(57) ABSTRACT

A method for express execution of navigation function is provided. A computer system is installed with a first operating system in a data storage device therein. The method includes the following steps: the computer system executing the BIOS of the computer system; before loading and executing the first operating system, the computer system detecting and activating a touch-control display device; the touch-control display device displaying an executive item icon representing the navigation function; detecting the executive item icon selection by the user; based on the selection, loading and executing the first operating system; and executing the navigation function corresponding to the selected executive item icon.

18 Claims, 15 Drawing Sheets

SYSTEM AND METHOD FOR EXPRESS EXECUTION OF NAVIGATION FUNCTION

CROSS-REFERENCES TO RELATED APPLICATIONS

The present application is a continuation-in-part application of U.S. patent application Ser. No. 11/230,657, filed on Sep. 21, 2005, which is hereby incorporated by reference.

FIELD OF THE INVENTION

The present invention relates to a method for launching navigation function of a computer system and, more particularly, to a method for express execution of navigation function with a touch-control interface.

BACKGROUND OF THE INVENTION

The multimedia playing system made with the integration of a computer system and an audiovisual player is gaining popularity and is widely used on many occasions, including offices and households, because the rapid development of computer technology.

The design of the conventional multimedia playing systems is basically interfacing a computer system with an audiovisual player. With this type of design, the user usually needs to boot the computer system up in order to activate and operate the audiovisual player. In other words, the user must wait until the computer system completes the BIOS program initialization, POST program, peripheral detection and driving, OS activation, system state setting, and so on, before the user can execute the audiovisual program to play the audiovisual data. It is inconvenient for the user as there is no shortcut to bypass the tedious booting process of the computer system. Similar problems also occur in a computer system having navigation function.

To overcome the aforementioned drawback, the current technology utilizes different designs to implement express execution of multimedia playing. These designs configure a different partition in the hard-disk and install a first operating system, such as Linux-based OS, and a second operation system, such as a Windows OS, in different hard-disk partitions. These designs require modification to the computer BIOS. The user can select the execution of PC mode or the AV mode by depressing its power button or specific hotkey respectively. When the user selects the AV mode, the computer system does not execute the usual booting process when the computer is turned on. Instead, the computer system loads and executes a first operating system in the first hard-disk partition, and drives the audiovisual player. That is, the user does not enter the Windows OS; therefore, the time waiting for the system to finish the initialization of the hardware is saved.

However, the current implementations still requires the user to memorize the operation instruction and follow strictly in order to select between the PC mode and the AV mode (or navigation mode). This lack of ease of use is still inconvenient for the user.

Although some designs display operation instructions on the monitor to guide the user, this display of instruction usually takes place after the computer systems enters the operating system mode; therefore, it does not meet the demands of express execution of playing multimedia data or express execution of navigation function.

Furthermore, as most designs require the user to enter their selections through keyboard or mouse, which are only activated after the computer system enters the operating system mode, it is still inconvenient for the user.

SUMMARY OF THE INVENTION

The present invention is provided to overcome the aforementioned drawbacks of the conventional methods of express execution of navigation function.

An objective of the present invention is to provide a method for express execution of navigation function with a touch-control interface for a computer system.

According to the method for express execution of navigation function with a touch control interface, the first step is to turn on the computer system. The computer system utilizing the method of the present invention at least includes a data storage device, a system memory, a BIOS, a touch-control display device, and a position detector; and the data storage device stores a first operating system, a touch-control display device driver for activating the touch-control display device, a position detector for activating the position detector, a navigation program, and a map image file.

After turning on the computer system, the computer system executes the BIOS of the computer system. Then, before loading and executing the first operating system, the computer system detects the touch-control display device and the position detector, loads and executes the touch-control display device driver to activate the touch-control display device, and displays an executive item icon representing the navigation function with the touch-control display device. The executive item icon representing the navigation function is for executing a procedure for loading and executing the first operating system, activating the position detector to determine a current position of the computer system, and loading and executing the navigation program to map the current position to the map image file.

The computer system detects whether a selection is made by touching the executive item icon displayed on the touch-control display device, and then the computer system executes the procedure corresponding to the executive item icon when the executive item icon representing the navigation function is touched on the touch-control display device.

By the method of the invention, a user can quickly determine to lunch the navigation function after the computer system completes the basic booting process. The computer booting process including loading and executing the operating system will not be lunched unless the user select to execute the navigation function. Therefore, the user does not need to waiting for the lunching of the computer booting process before selecting the navigation function.

Another objective of the present invention is to provide a method for express execution of navigation function with a touch-control interface for a computer system.

According to the present invention, the first is to turn on the computer system. The computer system utilizing the method at least includes a data storage device, a system memory, a BIOS, a touch-control display device, and a position detector; and the data storage device stores a first operating system, a second operating system, a navigation program, and a map image file.

After the computer system is turned on, the computer system executes the BIOS of the computer system. Then, before loading and executing the first operating system or the second operating system, the computer system displays an executive item icon representing a navigation function and another executive item icon representing a regular booting process with the touch-control display device. The executive item icon representing the navigation function is for executing a procedure for loading and executing the first operation system, activating the position detector to determine a current position of the computer system, and loading and executing the navigation program to map the current position to the map image file. And the executive item icon representing the regular computer booting process is for executing a procedure for loading and executing the second operating system. Then, the computer system determines which among the displayed executive item icons is selected by the touch-control display device, and then executes the procedure corresponding to the selected executive item icon.

By the method of the invention, a user can determine to execute the navigation function in a simplified operating system quickly, or to lunch a regular operating system.

Yet another objective of the present invention is to provide a computer system for express execution of navigation function.

The computer system comprises a control circuit, a BIOS memory, a system memory, a touch-control display device, a position detector, and at least one data storage device.

The BIOS memory is connected to the control circuit and stores a BIOS program. And the system memory is also connected to the control circuit to provide a random access memory partition for the space required for executing programs.

The touch-control display device is connected to the control circuit, for sending an input signal to the control circuit and receiving visual signals generated by the control circuit for displaying.

The position detector is connected to the control circuit for determining the current position of the computer system.

The data storage device stores a first operating system, a touch-control display device driver for activating the touch-control display device, a position detector driver for activating the position detector, a navigation program, and a map image file.

After the computer system is turned on, the touch-control display device displays an executive item icon representing the navigation function before loading and executing the first operating system. The control circuit determines whether the executive item icon representing the navigation function is selected according to the input signal sent by the touch-control display device before loading and executing the first operating system.

After the executive item icon representing the navigation function is selected, the control circuit loads and executes the first operating system, loads and executes the position detector driver for activating the position detector to determine a current position of the computer system, and loads and executes the navigation program to map the current position to the map image file.

By the computer system of the invention, a user can quickly determine to execute the navigation function after the computer system completes the basic booting process. The regular computer booting process including loading and executing the operating system will not be lunched unless the user select to execute the navigation function. Therefore, the user does not need to waiting for the lunching of the regular computer booting process before select execute the navigation function.

In comparison with the conventional methods and computer systems, the present invention allows the user to select the executive item icon to execute the corresponding navigation function without performing complicate operation. Therefore, the present invention provides a user-friendly interface for convenient use of the computer system. In addition, the computer system of the present invention activates touch-control display device after the BIOS and POST process, and waits for the user to enter their selection. Therefore, the user can directly execute the navigation function without waiting for entering the regular operating system environment of a computer system.

These and other objective, features, and advantages of the invention will be apparent to those skilled in the art, from a reading of the following brief description of the drawings, the detailed description of the preferred embodiment, and the appended claims.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

Figure 1:
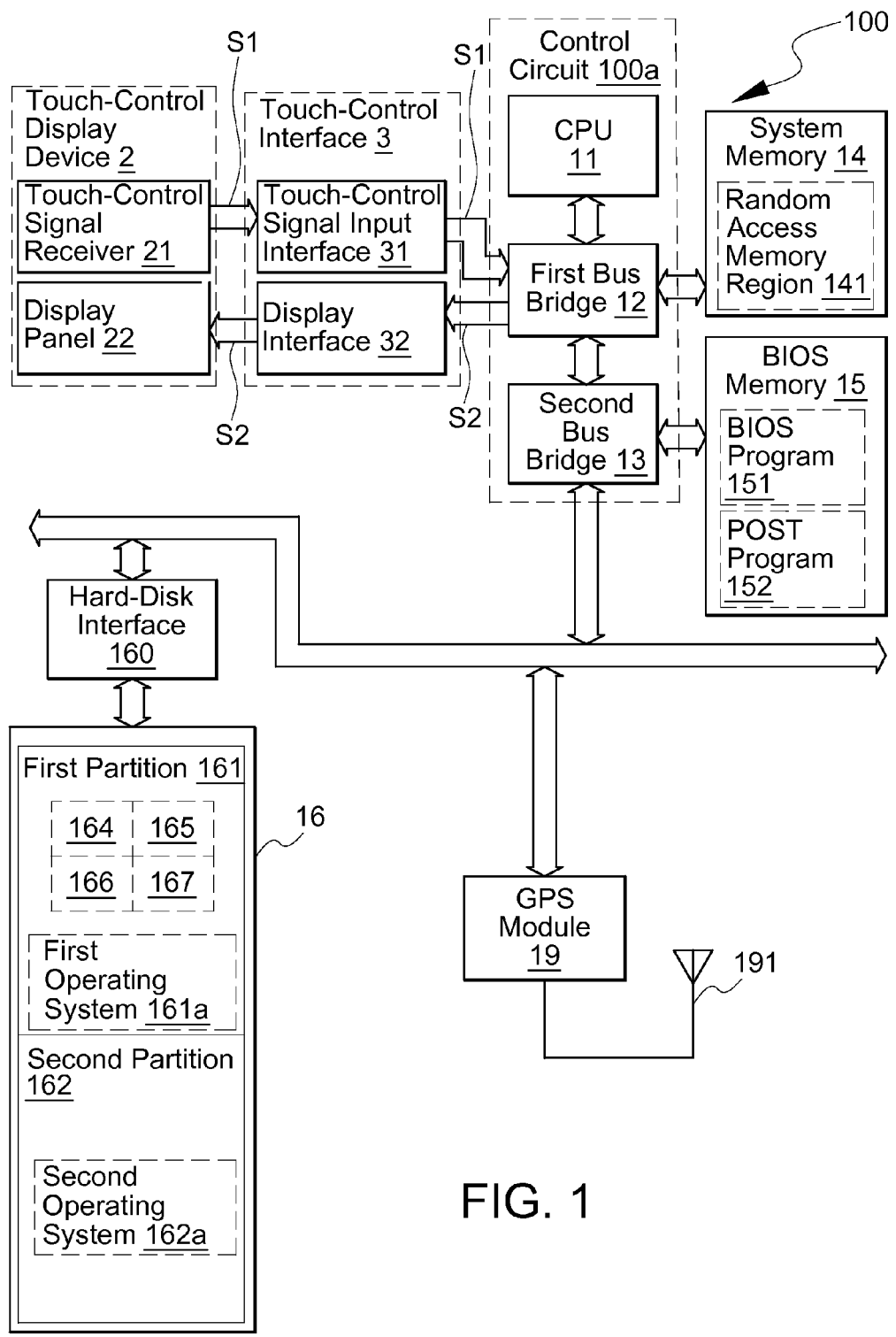
FIG. 1 shows a functional block diagram according to a first embodiment of the present invention.

With reference to the drawings and in particular to FIG. 1, which shows a functional block diagram according to a first embodiment of the present invention, a computer system 100 for express execution of navigation function comprises a control circuit 100a disposed therein.

The control circuit 100a includes a central processing unit 11 (CPU 11), a first bus bridge 12, and a second bus bridge 13. The CPU 11 is connected to the first bus bridge 12 through a system bus. The first bus bridge 12 is connected to a system memory 14. The computer system 100 further comprises a position detector for determining the current position of the computer system 100. A global positioning system module 19 (GPS module 19) is taken as an illustration of the position detector. The GPS module 19 is connected to the first bus bridge 12 or the second bus bridge 13 through the system bus.

A Basic-Input-Output-System memory 15 (BIOS memory 15) is connected to the second bus bridge 13 of the control circuit 100a. The BIOS memory 15 stores an BIOS program 151 and a power-on-self-test (POST) program 152, required by the computer system 100 during the booting process of the computer system 100.

The second bus bridge 13 is connected to a hard-disk interface 160 through a bus. The hard-disk interface 160 is connected to a hard-disk 16. The hard-disk 16 served as a data storage device is for storing data, such as a first operating system 161a, a second operating system 162a, a touch-control display device driver 164, a position detector driver, a navigation program 166, and a map image file 167 in the present invention. The data storage device described above is not limited to the hard-disk 16. Since the position detector illustrated above is a GPS module 19, the position detector driver is a GPS module driver 165.

The hard-disk 16 can be altered by a solid-state-disk drive, a flash memory module, or the other types of mass storage device. Since the data storage device is not limited to the hard-disk 16, the data storage device is not necessarily connected to the second bus bridge 13 through the hard-disk interface 160. For example, if the hard-disk 16 served as the data storage device is replaced by a flash memory module; the flash memory module is connected to the second bridge bus 13 through the other type of interface.

The hard-disk 16 is configured to comprise a first partition 161 and a second partition 162. The first partition 161 is installed with the first operating system 161a, such as Linux-based operating system, Tiny Windows-based operating system, or embedded operating system. The first partition 161 also stores the navigation program 166 and other application programs working under the first operating system environment. The second partition 162 is installed with the second operating system 162a, such as Windows-operating system and other application programs working under the second operating system environment.

In the above described embodiment, the first partition 161 and the second partition 162 are configured in one single hard-disk 16 for installing the first operating system 161a and the second operating system 162a respectively, and the drivers or application programs are stored in the same partition in which the required operating system is installed therein. However, the embodiment of the present invention is not restricted to one single hard-disk 16 or data storage device; two or more data storage devices can be utilized.

For example, when a first data storage device and a second data storage device are provided, the first partition 161 and the second partition 162 can be configured in different data storage device respectively. The first operating system 161a and the second operating system 162a are respectively installed to different data storage devices. Furthermore, the GPS module driver 165, the navigation program 166 or other application programs are not necessarily stored in the same data storage device that the required operating system is installed therein. That is, the data storage device storing the first operating system 161a can be different from the data storage device storing the touch-control display device driver 164, the GPS module driver 165, and the navigation program 166. Or one or more of the programs, including the touch-control display device driver 164, the GPS module driver 165, the navigation program 166, and the map image file 167, are stored in the data storage device which also stores the first operating system 161a, and the other programs are stored in another data storage device different from the data storage device storing the first operating system 161a. Or a third data storage device different from the first or the second data storage device can be utilized to store the drivers or application programs.

The GPS module 19 is connected to the CPU 11 through the first bridge bus 12 or the second bridge bus 13, and the hard-disk 16 stores the GPS module driver 165 for activating and communicating the GPS module 19. The GPS module 19 receives positioning signals from plural reference position stations through an antenna 191; for example, the positioning signals are the GPS signals from plural GPS satellites. And then the GPS module 19 calculates and determines a current position (for example: the geodetic coordinates) of the computer system 100 according to the received GPS signals.

The approach for determining the current position is not limited to Global Positioning System (GPS); the alternative approach can be Assisted Global Position System (AGPS), Differential Global Positioning System (DGPS), Carrier-Phase Differential Global Positioning System (CDGPS), Galileo Positioning System, or Global navigation satellite system (GLONASS).

The computer system 100 of the first embodiment also comprises a touch-control display device 2, connected to the control circuit 100a of the computer system 100 through a touch-control interface 3, to serve as a combination of a touch-control signal receiver 21 and a display panel 22. The hard-disk 16 of the computer system 100 stores the touch-control display driver 164 for activating the touch-control display device 2. The touch-control display driver 163 can also be built-in inside the BIOS memory 15. The touch-control display device 2 can receives instructions input, send an input signal S1 to control circuit 100a, and receives visual signals S2 generated by the control circuit 100a to display information of the computer system 100.

In the preferred embodiment of the present invention, the touch-control interface 3 is a high speed display bus interface, such as known AGP display bus interface, connected to the first bus bridge 12 or a PCI bus interface connected to the second bus bridge 13.

The touch control signal receiver 21 is disposed on the display panel 22 to form the touch-control display device 2. The touch-control signal receiver 21 and the display panel 22 are connected to the first bus bridge 12 of the computer system 100 through a touch-control signal input interface 31 and a display interface 32, respectively. When the touch-control signal receiver 21 is touched, the touch-control signal receiver 21 sends an input signal S1 to the control circuit 100a of the computer system 100. Similarly, a visual signal S2 generated by the control circuit 100a the computer system 100 is received by and displayed on the display panel 22 of the touch-control display device 2.

Figure 2:
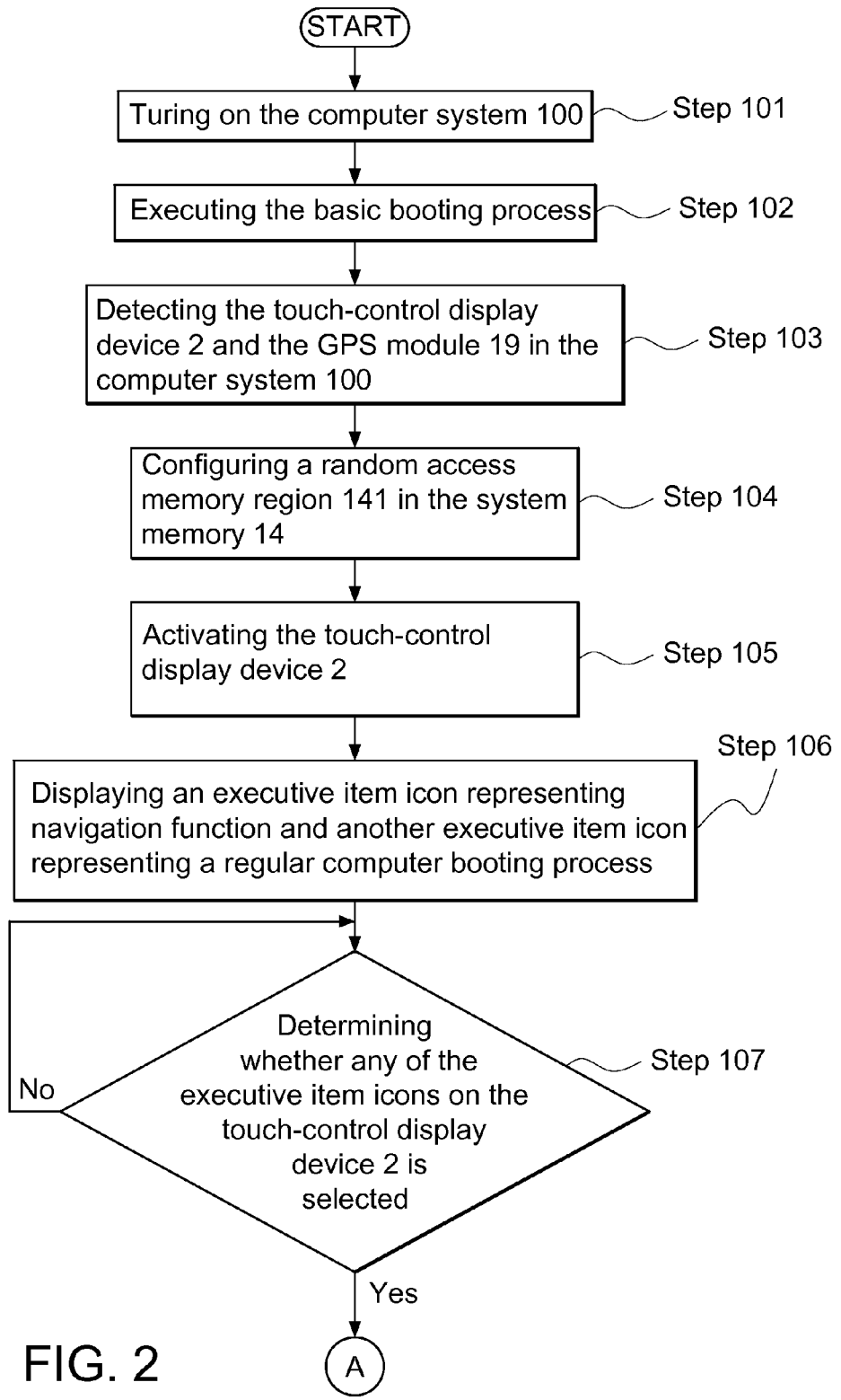
FIG. 2 and FIG. 3 show a flowchart according to the first embodiment of the present invention.
Figure 3:
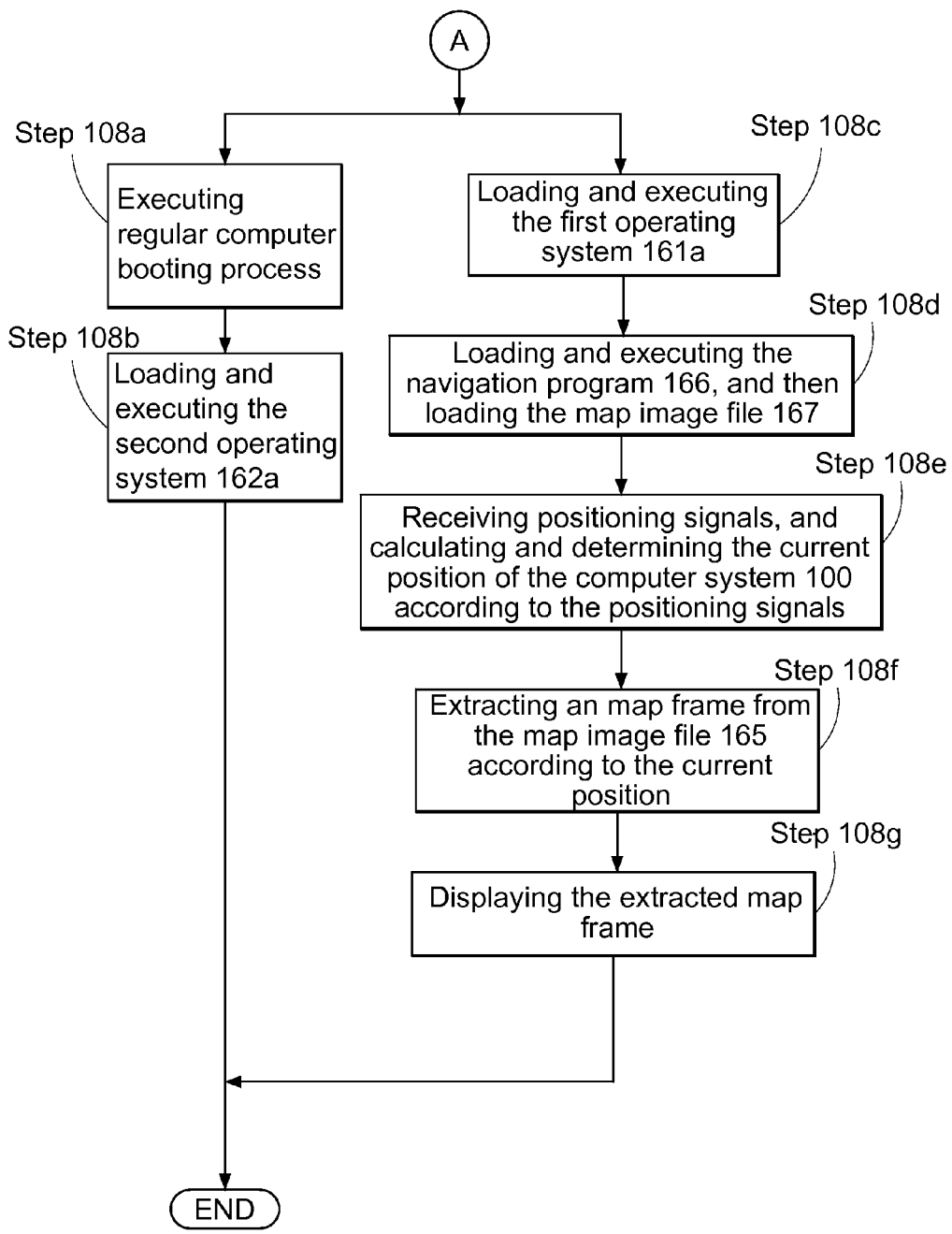

FIG. 2 and FIG. 3 show the flowchart of first embodiment of the present invention. The following description refers to FIGS. 1, 2, and 3.

Step 101 is to turn on the computer system 100.

In the step 102, the computer system 100 executes the BIOS; that is, the computer system 100 loads and executes the BIOS program 151 and the POST program 152 from the BIOS memory 15.

Before loading and executing the first operating system 161a or the second operating system 162a, the computer system 100 executing the BIOS program 151 performs the following steps.

Step 103 is for the computer system executing the BIOS program 161 to detect the touch-control display device 2 and the GPS module 19 in the computer system 100.

Step 104 is to configure a random access memory region 141 in the system memory 14 of the computer system 100 for the space required for executing the first or the second operating system 161a, 162a, the touch-control display driver 164, the GPS module driver 165, the navigation program 166, and the map image file 167.

Step 105 is for the BIOS program 151 to load and execute the touch-control display driver 163 from the hard-disk 16 to activate the touch-control display device 2, so that the touch-control display device 2 can start to operate.

Step 106 is for the display panel 22 of the touch-control display device 2 to display an executive item icon 5a representing the navigation function and another executive item icon 5b representing a regular computer booting process.

Step 107 is for the computer system 100 detecting whether any of the executive item icons 5a, 5b on the touch-control display device 2 is selected, i.e., touched on the touch-control display device 2. That is, the control circuit 100a of the computer system 100 determines which among executive item icons 5a, 5b is selected according to the input signal S1 sent by the touch-control signal receiver 21 as in Step 107. Through the touch-control signal receiver 21 of the touch-control display device 2, the control circuit 100a of the computer system 100 detects whether any executive item icon on the touch-control display device 2 is selected by touching the executive item icon displayed on the touch-control display device 2. When a selection is detected, the computer system 100 determines which among executive item icons 5a, 5b is selected.

Figure 4:
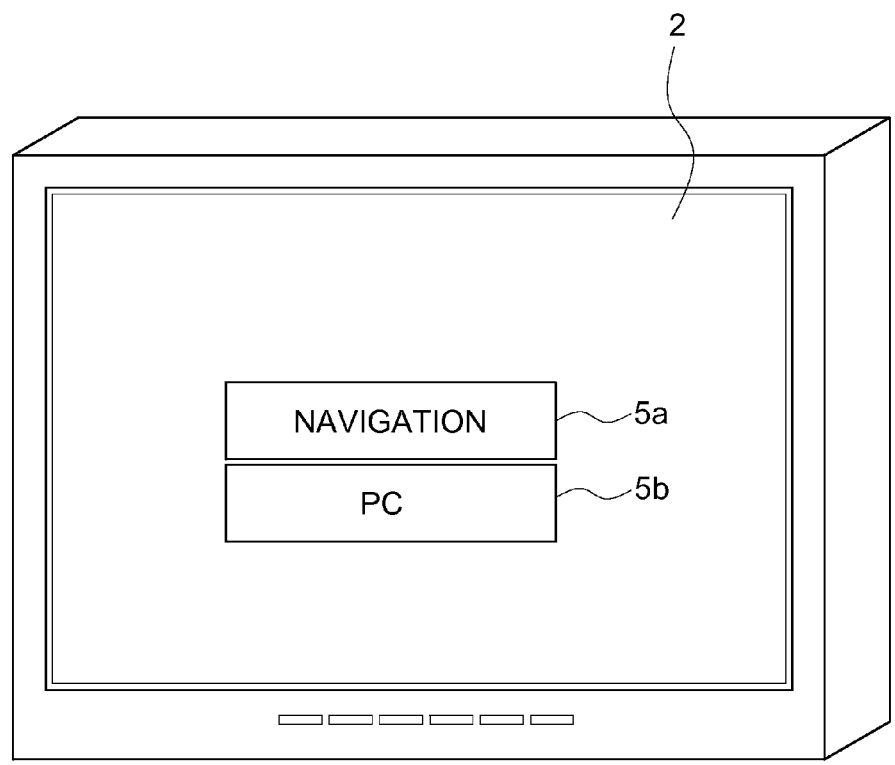
FIG. 4 shows a schematic view of the executive item icons displayed on touch-control display device according to the first embodiment of the present invention.

FIG. 4 shows the executive item icons 5a, 5b displayed on the display panel 22 of the touch-control display device 2.

The executive item icon 5b representing the regular computer booting process is for executing a procedure for loading and executing the second operating system 162a.

When the executive item icon representing a regular computer booting process 5b is selected, the computer system 100 executes the regular computer booting process, as in Step 108a. In the Step 108a, the computer system 100 loads and executes the second operating system 162a from the second partition 162 of the hard-disk 16 of the computer system 100 when the executive item icon representing the regular computer booting process 5b is selected.

The executive item icon representing navigation function 5a is for executing a procedure for loading and executing the first operating system 161a, activating the GPS module 19 to determine the current position of the computer system 100, and loading and executing the navigation program 164 to map the current position to the map image file 171.

When the executive item icon representing navigation function 5a is selected, the control circuit 100a of the computer system 100 loads and executes the first operating system 161a in the first partition 161 of the hard-disk 16, as in step 108c. The first operating system 161a is a simplified operating system, which only provides basic operating environment for activating the GPS module 19 and executing the procedure corresponding to the executive item icon representing the executive item icon representing the navigation function 5a. In Step 108c, the control circuit 100a of the computer system 100 also loads the GPS module driver 165 for activating and controlling the GPS module 19 to determine a current position of the computer system 100.

In Step 108d, the control circuit 100a of the computer system 100 loads and executes the navigation program 166, and then loads the map image file 167. Both the navigation program 166 and the map image file 167 are loaded from the first partition 161 of the hard-disk 16.

In Step 108e, the control circuit 100a controls the GPS module 19 to receive positioning signals, so that the GPS module 19 starts to receive positioning signals through the antenna 191, calculates and determines the current position of the computer system 100 according to the positioning signals, and then the control circuit 100a loads and executes the navigation program 166 to map the current position to the map image file 167.

In Step 108f, the control circuit 100a of the computer system 100 extracts an map frame from the map image file 165 according to the determined current position. And then in Step 108g, the control circuit 100a of the computer system 100 generates the visual signals S2 to drive the display panel 22 to display the extracted map frame.

To this point, the method of the present invention allows the user to quickly activate the GPS module 19 and launching the navigation program 166 without waiting for the tedious booting process of a regular operating system.

When the user attempts to quickly execute the navigation function, the computer system 100 loads and executes the first operating system 161a, wherein the operating system booting process of the first operating system 161a can be quickly completed. When user attempts to launch more functions other than the navigation function, the computer system 100 loads and executes the second operating system 162a, so as to load and execute the other applications.

Figure 5:
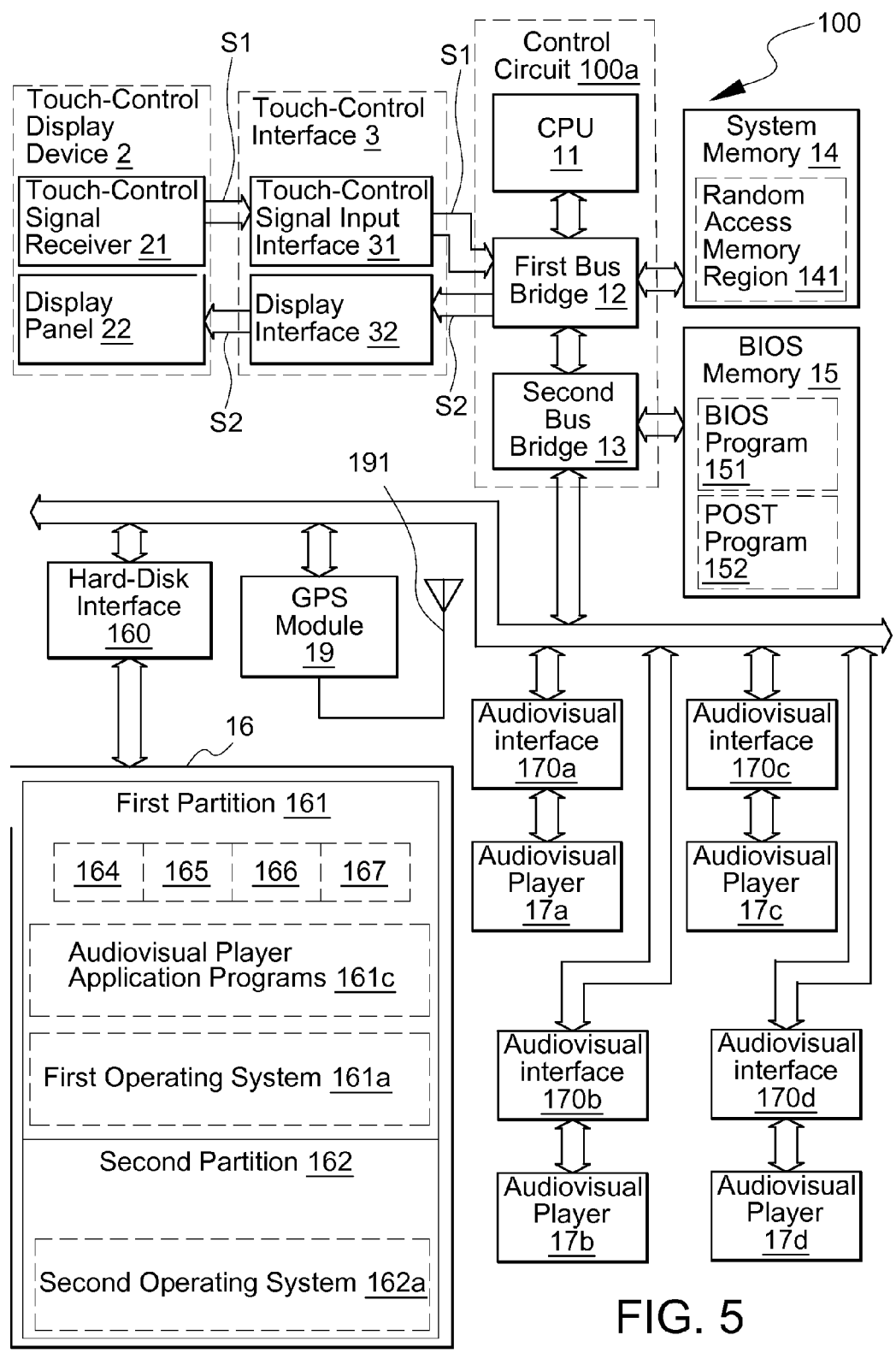
FIG. 5 shows a functional block diagram according to a second embodiment of the present invention.

Please refer to FIG. 5, which shows a functional block diagram according to a second embodiment of the present invention, a computer system 100 for express execution of navigation function comprises a CPU 11, a first bus bridge 12, and a second bus bridge 13.

The CPU 11, the first bus bridge 11, the second bridge 12, and the GPS module 19 are similar to those in the first embodiment. The hard-disk 16 of the second embodiment not only stores a navigation program 166 and the corresponding map image file 167, but also stores a plurality of audiovisual player application programs 161c.

Moreover, the computer system 100 of the second embodiment further comprises a plurality of audiovisual players 17a, 17b, 17c, and 17d, connected to the second bus bridge 13 of the control circuit 100a of the computer system 100 through audiovisual interfaces 170a, 170b, 170c, 170d. The audiovisual interfaces 170a, 170b, 170c, 170d can adopt conventional standard interfaces to connect the audiovisual players 17a, 17b, 17c, 17d to the second bus bridge 13, so that the control circuit 100a of the computer system 100 can control the playing functions of the audiovisual players 17a, 17b, 17c, 17d. The audiovisual players 17a, 17b, 17c, 17d can be a DVD player, MP3 player, CD player, or TV.

Figure 6:
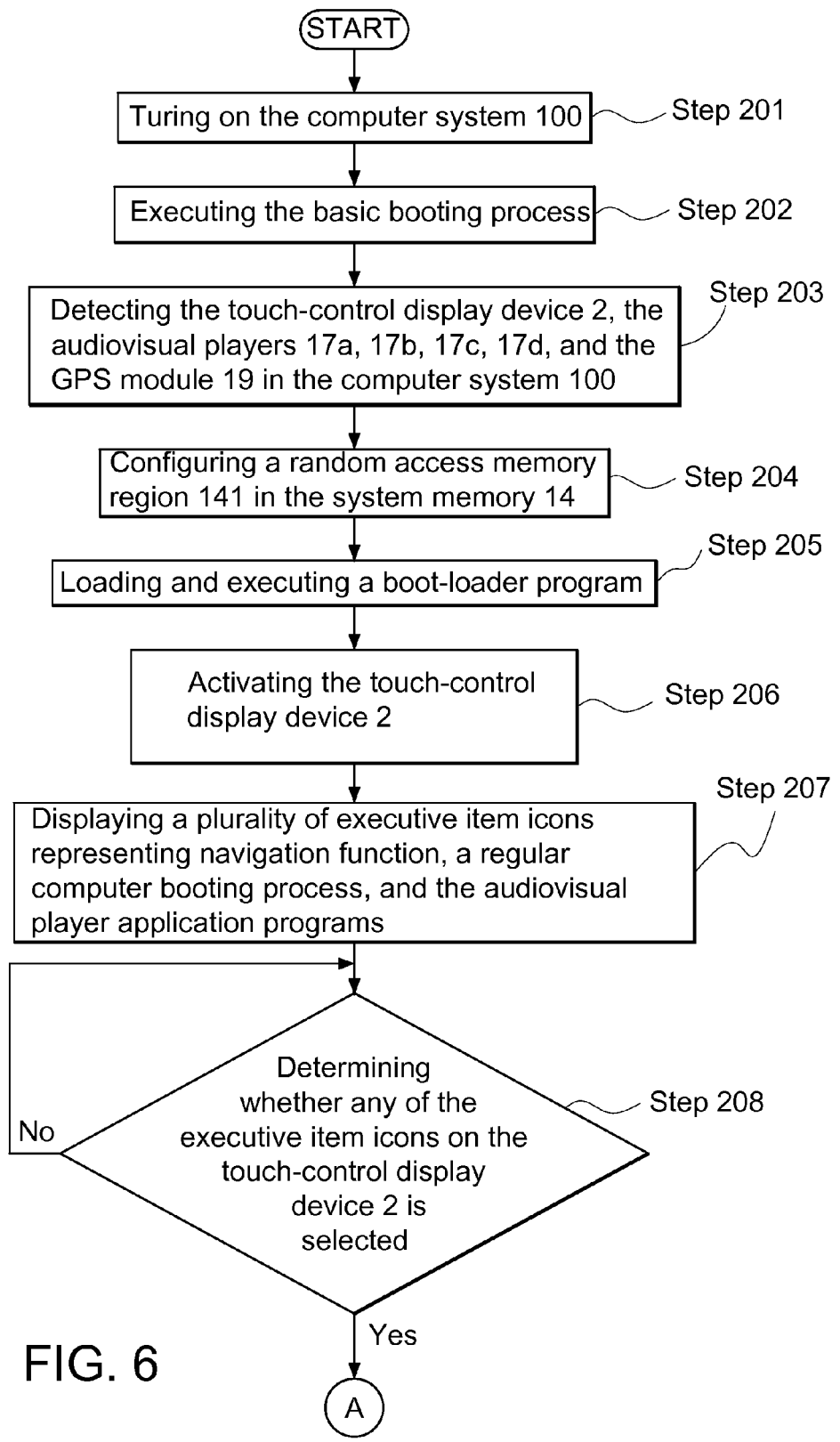
FIGS. 6, 7, and 8 show a flowchart according to the second embodiment of the present invention.
Figure 7:
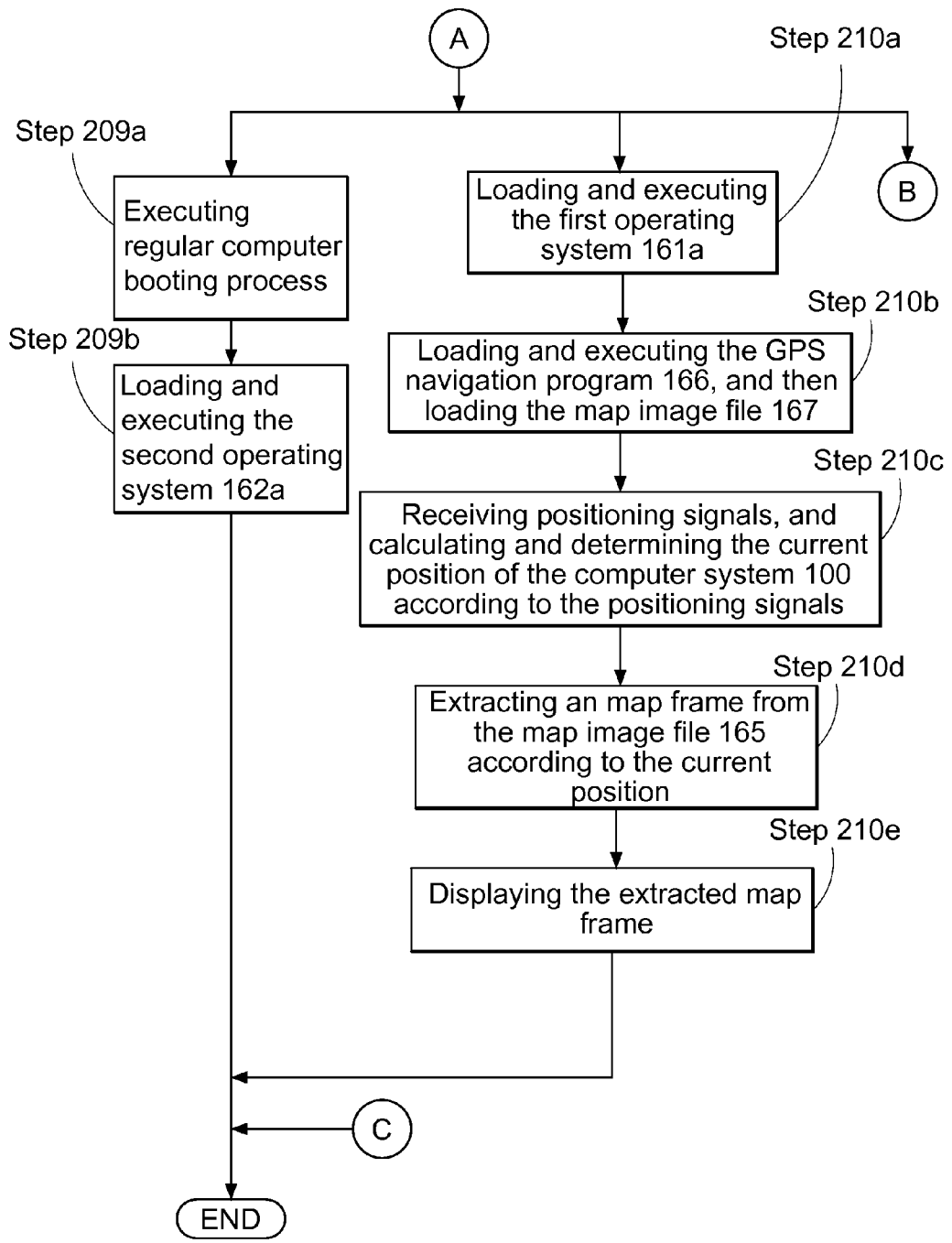
Figure 8:
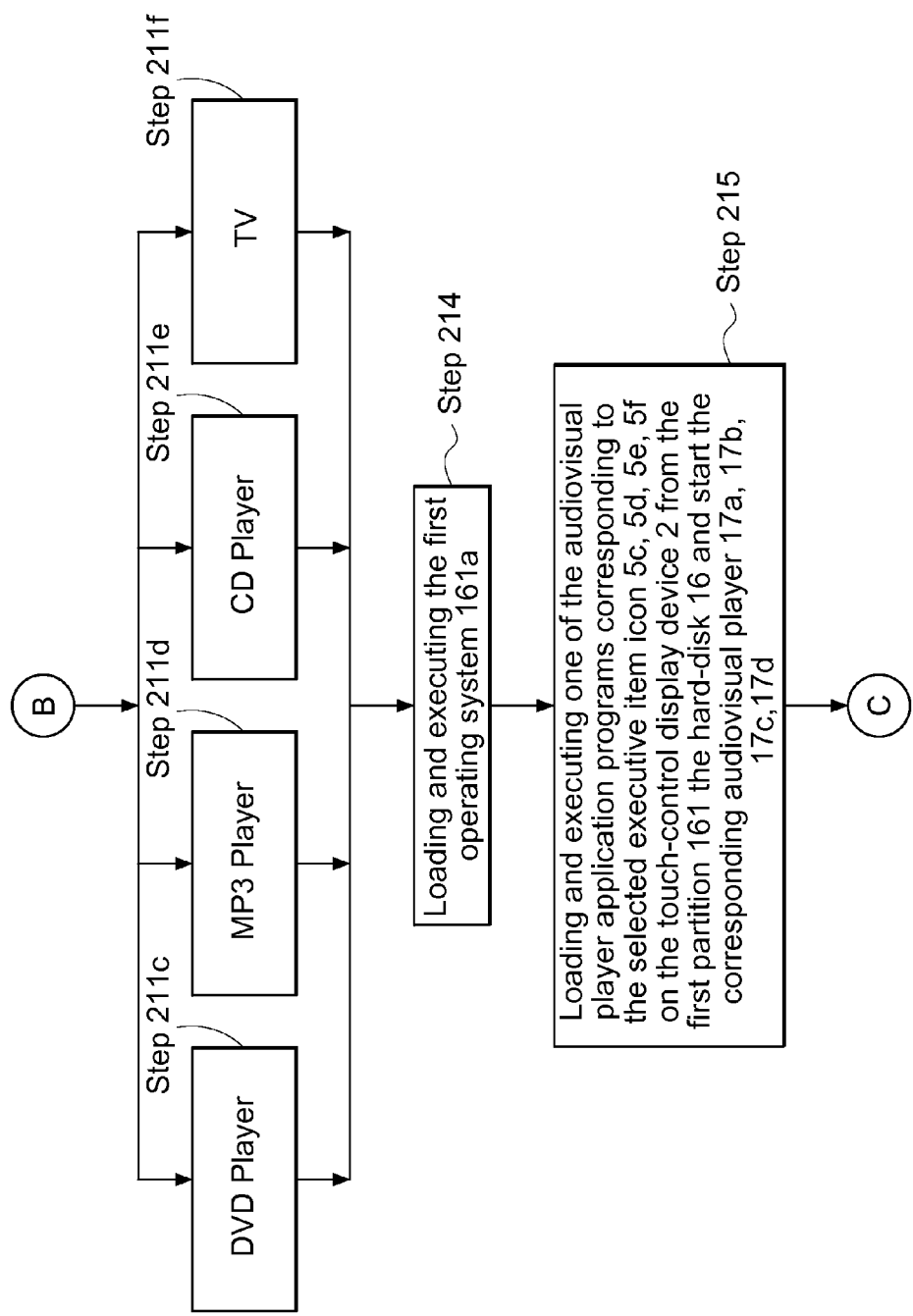

FIG. 6, FIG. 7, and FIG. 8 show the flowchart of the second embodiment of the present invention. The following description refers to FIG. 5, FIG. 6, FIG. 7, and FIG. 8.

Step 201 is to turn on the computer system 100.

In Step 202, the computer system 100 executes a basic booting process.

Before loading and executing the first operating system 161a or the second operating system 162a, the computer system 100 executing the BIOS program 151 performs the following steps.

In Step 203, the computer system 100 executing the BIOS program 151 detects the touch-control display device 2, the audiovisual players 17a, 17b, 17c, 17d, and GPS module 19 in the computer system 100. As aforementioned description, the audiovisual players 17a, 17b, 17c, 17d can be DVD player, MP3 player, CD player, TV, and so on.

In Step 204, the computer system 100 configures a random access memory region 141 in the system memory 14 of the computer system 100 for the space required for executing the first or the second operating system 161a, 162a, the touch-control display driver 164, the GPS module driver 165, the navigation program 166, the audiovisual player driver, and the audiovisual player application program 161c.

In Step 205, the computer system 100 executing the BIOS program 151 loads and executes a boot-loader program stored in the main boot record (MBR) sector of the hard-disk 16.

In Step 206, by executing the boot-loader program, the computer system 100 loads and executes the touch-control display driver 164 from the hard-disk 16 to activate the touch-control display device 2, so that the touch-control display device 2 can start to operate. In Step 206, the computer system 100 may also load the GPS module driver 165 and the drivers of the audiovisual players 17a, 17b, 17c, 17d, so as to activate the GPS module 19 and the audiovisual players 17a, 17b, 17c, 17d at this time or later.

In Step 207, the display panel 22 of the touch-control display device 2 displays a plurality of executive item icons 5a, 5b, 5c, 5d, 5e, 5f representing the navigation function, a regular computer booting process, and each of the audiovisual player application programs.

In Step 208, the control circuit 100a of the computer system 100 detects whether any of the executive item icons 5a, 5b, 5c, 5d, 5e, 5f displayed on the touch-control display device 2 is selected through the touch-control display device 2. When selection is detected, the computer system 100 determines which among the executive item icons 5a, 5b, 5c, 5d, 5e, 5f is selected according to the input signal S1 sent by the touch-control signal receiver 21.

Figure 9:
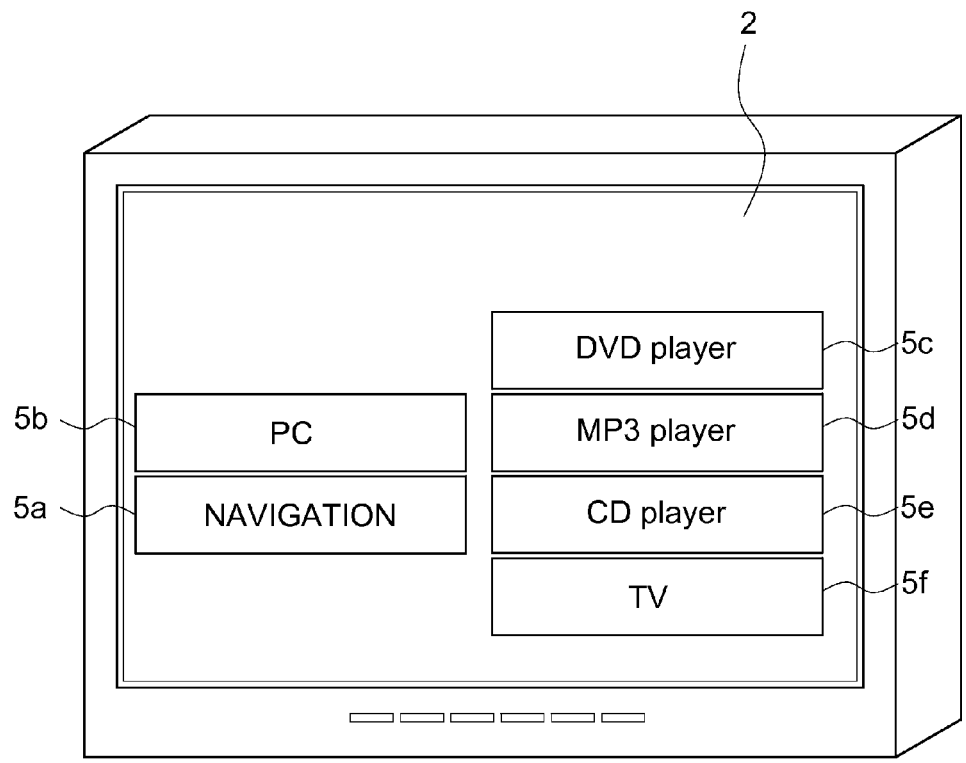
FIG. 9 shows a schematic view of the executive item icons displayed on touch-control display device according to the second embodiment of the present invention.

FIG. 9 shows the executive item icons 5a, 5b, 5c, 5d, 5e, 5f displayed on the display panel 22 of the touch-control display device 2. Similar to the first embodiment, the executive item icon 5b representing the regular computer booting process is for executing a procedure for loading and executing the second operating system 162a.

Refer to FIGS. 7 and 9, when the executive item icon representing the regular computer booting process 209a is selected, the second embodiment of the present invention enters the regular computer booting process, as in Step 209a. And then the computer system loads and executes the second operating system 162a from the second partition 162 of the hard-disk 16 of the computer system 100, as in Step 209b.

Refer to FIGS. 7 and 9, when the executive item icon representing navigation function 5a is selected, the control circuit 100a of the computer system 100 performs the following Steps: loading and executing the first operating system 161a, as in Step 210a; loading and executing the navigation program 166, and then loading the map image file 167 as in Step 210b; receiving positioning signals and determining the current position of the computer system 100 according to the positioning signals, and mapping the current position to the map image file 167, as in Step 210c; extracting an map frame from the map image file 165 according to the determined current position, as in Step 210d; and displaying the extracted map frame, as in Step 210e.

Please refer to FIG. 9 again, the other executive item icons 5c, 5d, 5e, 5f respectively represent different one among the audiovisual player application programs 161c. These executive item icons include a DVD player icon 5c, a MP3 player icon 5d, a CD player icon 5e, and a TV icon 5f. Each of the executive item icons 5c, 5d, 5e, 5f representing one of the audiovisual player application programs 161c is for executing a procedure for loading and executing the first operating system 161a, activating a corresponding audiovisual player 17a, 17b, 17c, 17d, loading and executing the corresponding audiovisual player application programs 161c, and activating and playing the audiovisual player 17a, 17b, 17c, 17d.

Please refer to FIGS. 8 and 9, when the user touches the touch-control display device 2 to select one of the DVD player icon 5c, the MP3 player icon 5d, the CD player icon 5e, and the TV icon 5f, the control circuit 100a of the computer system 100 determines the selection, as in Step 211c, 211e, 211f, 211e, the control circuit 100a of the computer system 100 loads and executes the first operating system 161a in the first partition 161 of the hard-disk 16, as in Step 214.

Then, the control circuit 100a of the computer system 100 loads and executes one of the audiovisual player application program 161c corresponding to the selected executive item icon 5c, 5d, 5e, 5f on the touch-control display device 2 from the first partition 161 of the hard-disk 16 and starts the corresponding audiovisual player, as in Step 215.

After the first operating system 161a is loaded and executed, the computer system 100 loads and executes the audiovisual player application program 162b and plays the audiovisual player corresponding to the selected icon on the touch-control display device 2 from the hard-disk 16. To this point, the method of the present invention allows the user to quickly activate the audiovisual player application programs 161c or the navigation program 166 without waiting for the tedious booting process of a regular operating system, as in Steps 209a to 209b.

One difference between the first embodiment and the second embodiment is that the computer system 100 in the second embodiment further comprises a boot-loader program stored in the MBR of the hard-disk 16. If the storage capacity of the BIOS memory 15 is large enough, the boot-loader program can be integrated into the BIOS program 151. At this time, the step for loading and executing the boot-loader program can be omitted, such as that disclosed in the first embodiment, and the BIOS program 151 is utilized to activate the touch-control display device 2, detect the selection of the executive item, load and execute the operating system, and load and execute the other application program.

In the second embodiment, more executive item icons are required to be displayed. Under such a circumstance, the arrangement of executive item icons displayed could become overcrowded, or the size of each executive item icon could become too small. To this point, the similar programs or function can be categorized into one item group, and a group icon can shown at first; if the group icon is selected, the image frame displayed is refreshed and the executive item icons representing these programs or function included in the item group is displayed.

Please refer to FIGS. 10, 11, 12, and 13, a flowchart of a third embodiment of the present invention is shown. In the third embodiment, the computer system 100 is the same as that in the second embodiment shown in FIG. 5.

Figure 10:
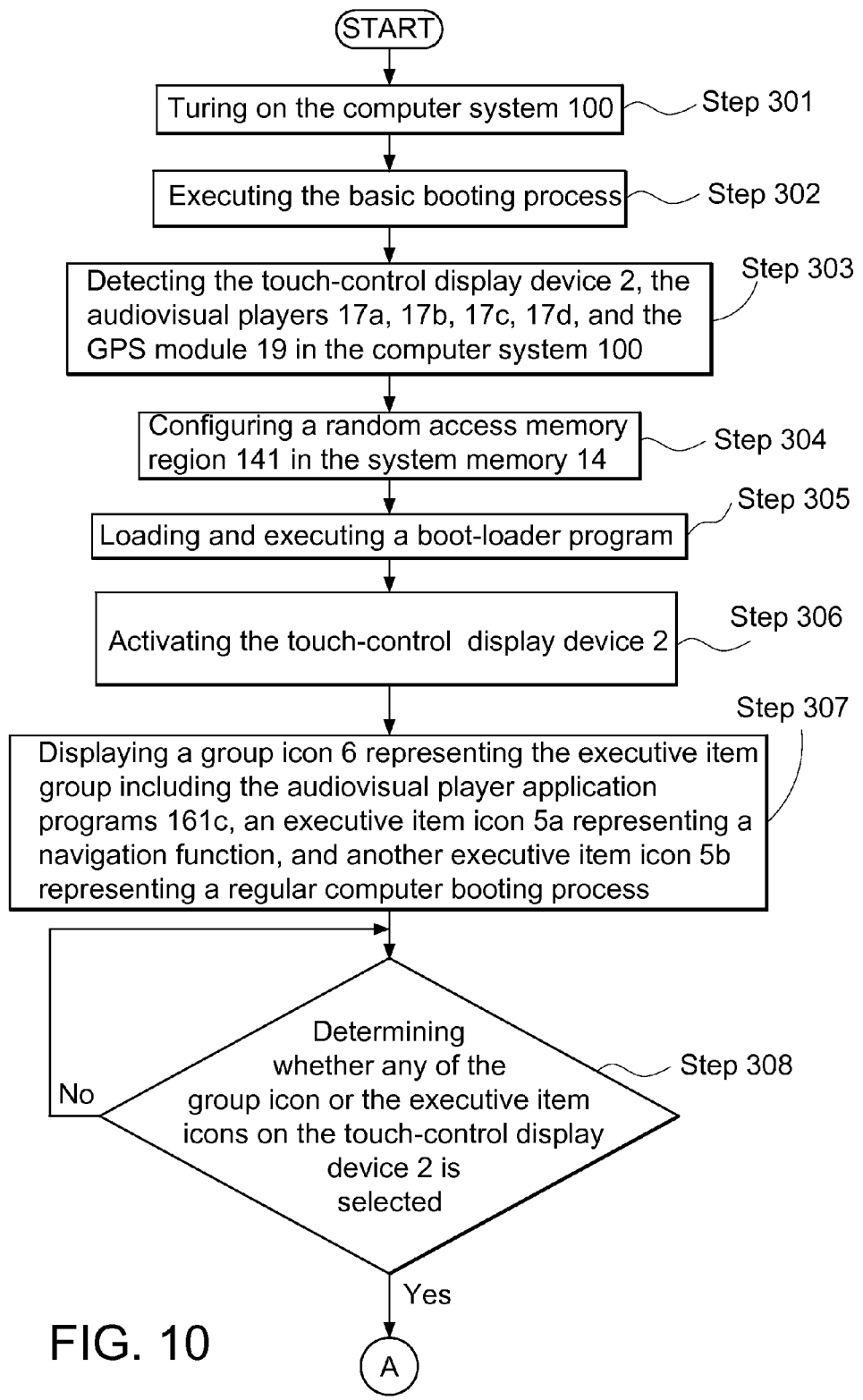
FIGS. 10, 11, 12, and 13 show a flowchart according to the third embodiment of the present invention.

Refer to FIG. 10, Steps 301 to 306 are the same as the Steps 201 to 206 in the second embodiment.

In Step 307, the display panel 22 of the touch-control display device 2 displays a group icon 6 representing an executive item group including the audiovisual player application programs 161c, an executive item icon 5a representing a navigation function, and another executive item icon 5b representing a regular computer booting process.

Figure 15:
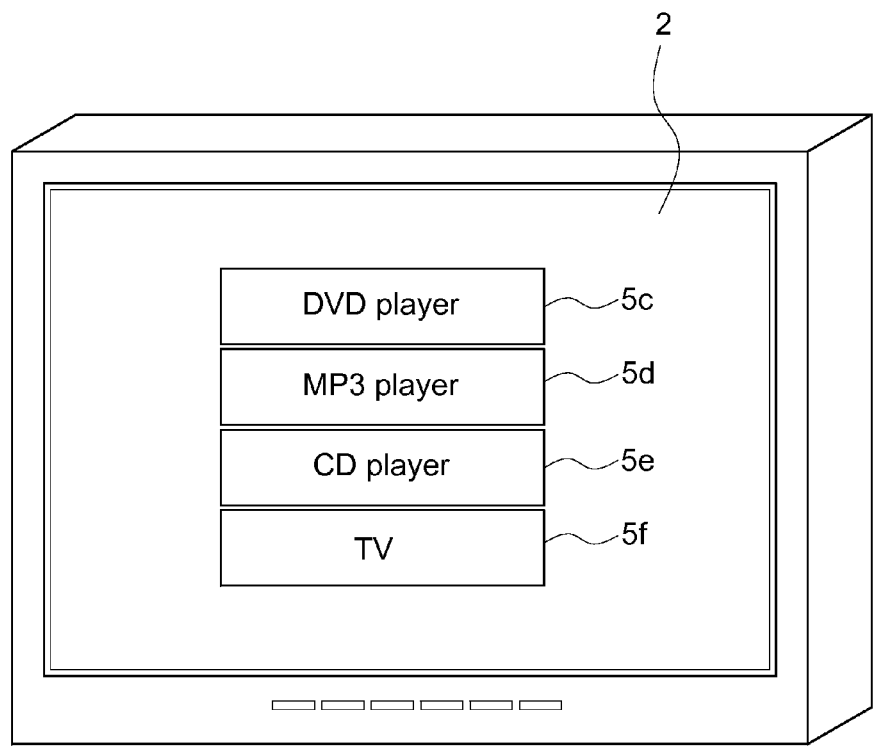
FIG. 15 shows a schematic view of a plurality of executive item icons displayed on touch-control display device according to the flowchart of the third embodiment.

FIG. 15 shows the group icon 6 and the executive item icons 5a, 5b displayed on the display panel 22 of the touch-control display device 2. The audiovisual player application programs 161c are categorized into the executive item group and the group icons 6 represents the executive item groups including the audiovisual player application programs 161c. The executive item icon representing the navigation function 5a is for executing a procedure for loading and executing the first operating system 161a, activating the GPS module 19 to determine the current position of the computer system 100, and loading and executing the navigation program 164. The executive item icon representing the regular computer booting process 2b is for executing a procedure for loading and executing the second operating system 162a.

In Step 308, the computer system 100 detects whether any of the group icon 6 and the executive item icons 5a, 5b on the touch-control display device 2 is selected through the touch-control display device 2. When a selection is detected, the computer system 100 determines which among the group icon 6 and the executive item icons 5a, 5b is selected.

Figure 11:
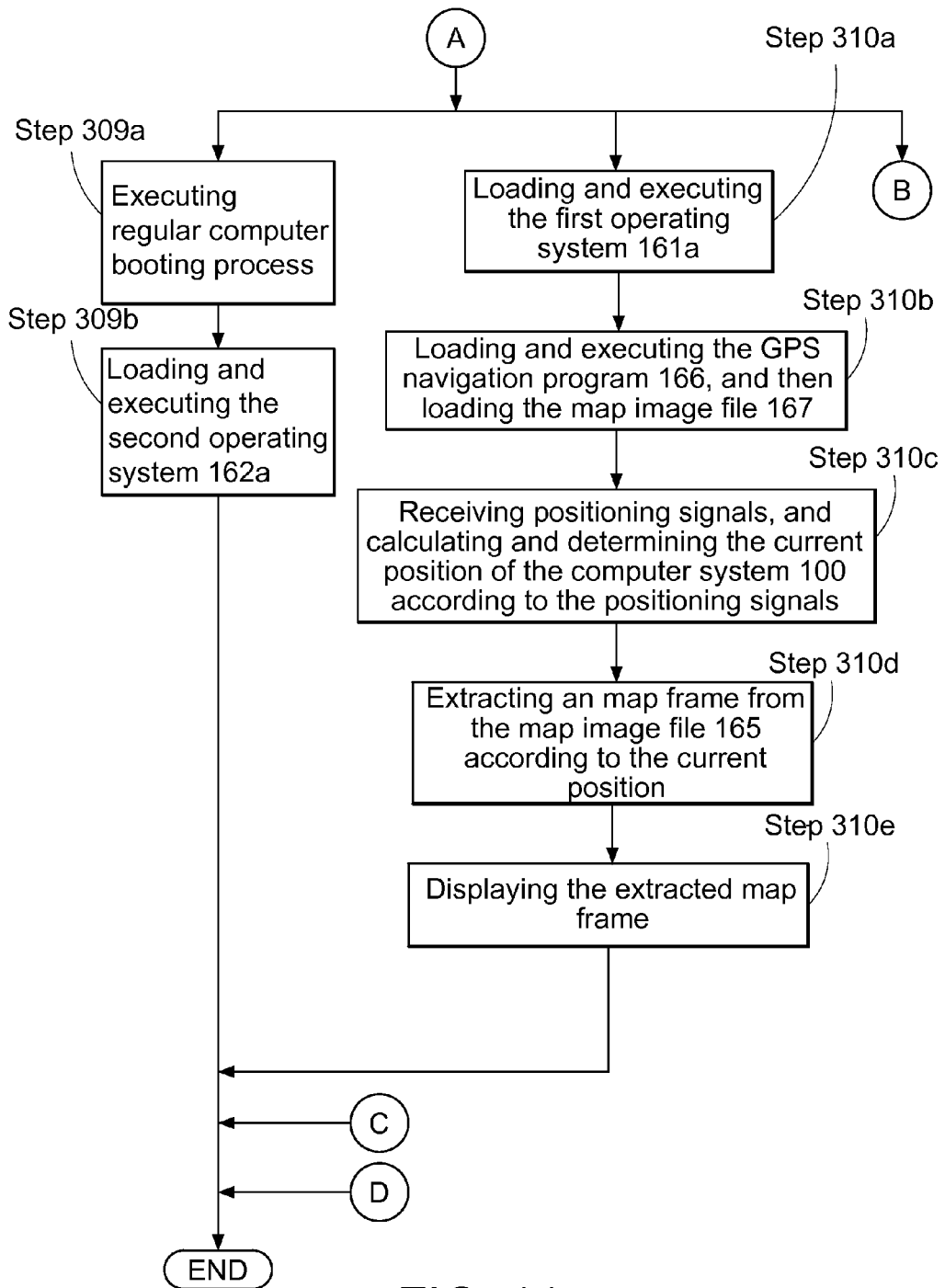
Figure 12:
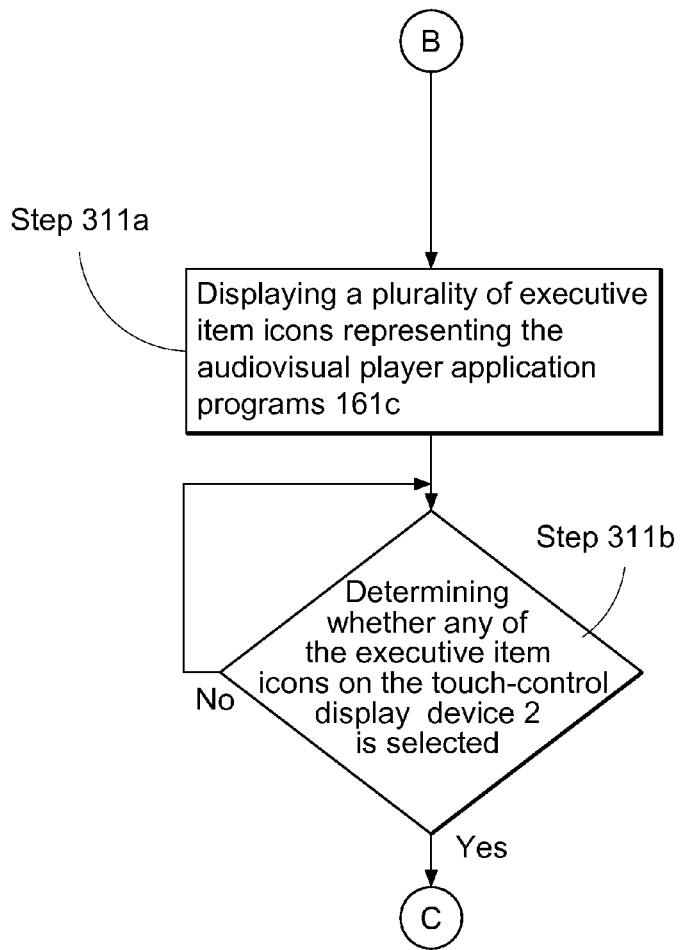
Figure 13:
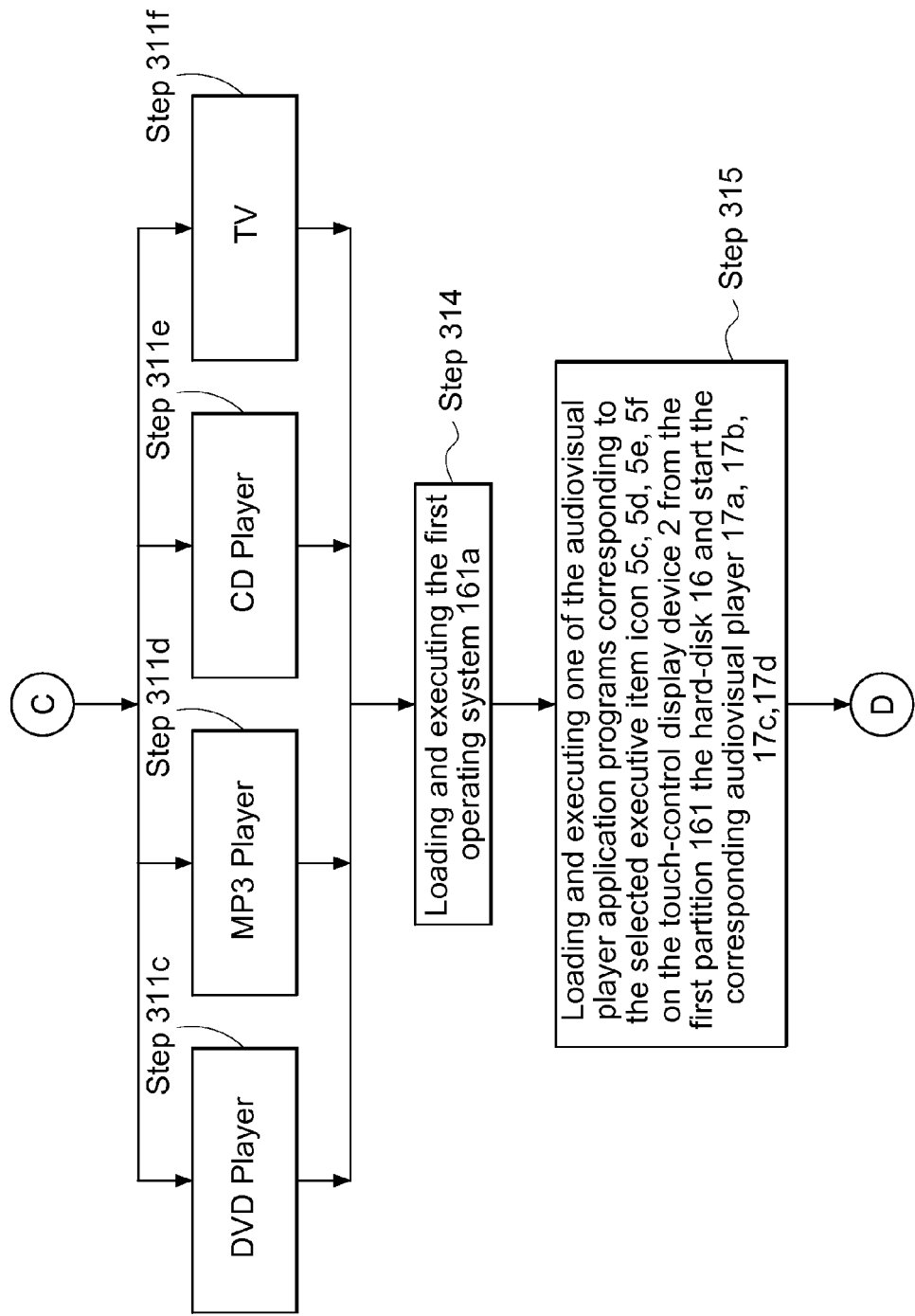

Refer to FIG. 11, when the executive item icon representing the regular computer booting process 209a is selected, the third embodiment of the present invention enters the regular computer booting process, and loads and executes the second operating system 162a, as in Steps 309a and 309b.

Refer to FIG. 11, when the executive item icon representing the navigation 5b is selected, the third embodiment of the present invention loads and executes the first operating system 161a and then executes the navigation function, as in Steps 310a to 310d.

Figure 14:
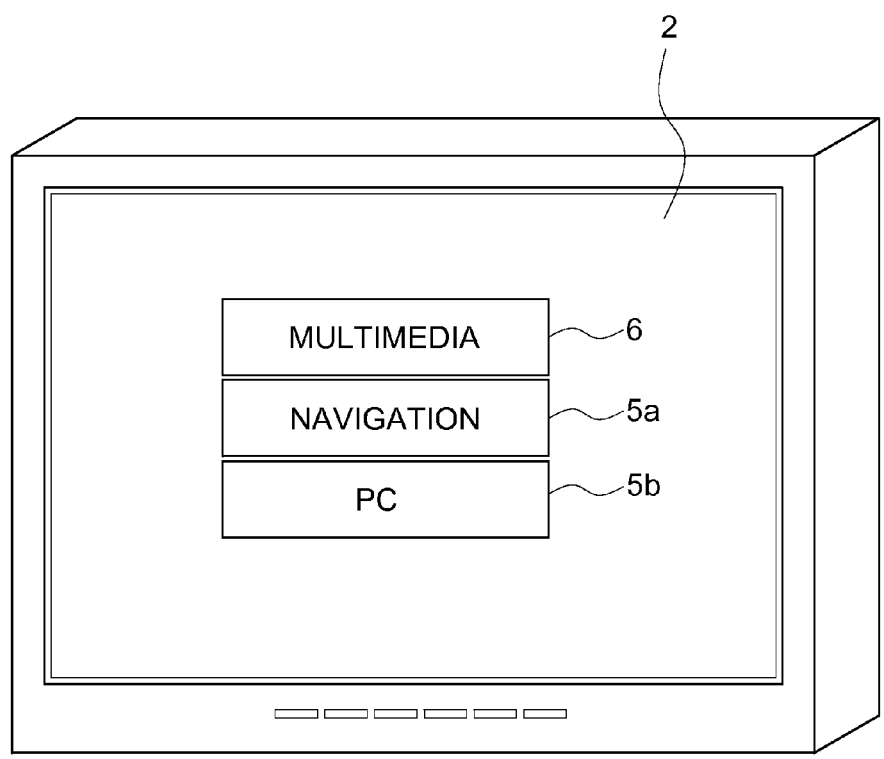
FIG. 14 shows a schematic view of a plurality of executive item icons and a group icon displayed on touch-control display device according to the flowchart of the third embodiment.

Refer to FIGS. 14 and 15, when the group icon 6 representing the audiovisual player application programs 161c is selected, the computer system 100 displays a plurality of executive item icons 5c, 5d, 5e, 5f representing the audiovisual player application programs 161c by the display panel 22 of the touch-control display device 2, as in Step 311a.

When the user touches the touch-control display device 2 to select one of the DVD player icon 5c, the MP3 player icon 5d, the CD player icon 5e, and the TV icon 5f, the control circuit 100a of the computer system 100 determines the selection, as in as in Step 311c, 311d, 311e, 311f, the control circuit 100a of the computer system 100 loads and executes the first operating system 161a in the first partition 161 of the hard-disk 16, as in Step 314.

After the first operating system 161a is loaded and executed, the computer system 100 loads and executes the audiovisual player application program 162b and plays the audiovisual player 17a, 17b, 17c, 17d corresponding to the selected executive item icon on the touch-control display device 2 from the hard-disk 16. To this point, the method of the present invention allows the user to quickly activate the audiovisual player application programs 161c without waiting for the tedious booting process of a regular operating system, as in Step 315.

The aforementioned embodiments show that the present invention provides a method for express execution of navigation function with a user-friendly interface which is easy to operate. The present invention also shortens the waiting period of a regular booting process in conventional multimedia computer system.

While the invention has been described in connection with what is presently considered to the most practical and preferred embodiment, it is to be understood that the invention is not to be limited to the disclosed embodiment, but on the contrary, is intended to cover various modifications and equivalent arrangement included within the spirit and scope of the appended claims.

What is claimed is:

1. A method for express execution of navigation function with a touch-control interface for a computer system, comprising the following steps of:
   (a) turning on the computer system;
      wherein the computer system is arranged such that the computer system at least includes a data storage device, a system memory, a BIOS, a touch-control display device, and a position detector; and the data storage device stores a first operating system, a touch-control display device driver for activating the touch-control display device, a position detector for activating the position detector, a navigation program, and a map image file;
   (b) executing the BIOS of the computer system;
   (c) before loading and executing the first operating system, performing the steps of:
      (c1) detecting the touch-control display device and the position detector;
      (c2) loading and executing the touch-control display device driver to activate the touch-control display device;
      (c3) displaying an executive item icon representing the navigation function with the touch-control display device;
         wherein the executive item icon representing the navigation function is for executing a procedure for loading and executing the first operating system, activating the position detector to determine a current position of the computer system, and loading and executing the navigation program to map the current position to the map image file;
      (c4) detecting whether a selection is made by touching the executive item icon displayed on the touch-control display device; and
      (c5) executing the procedure corresponding to the executive item icon when the executive item icon representing the navigation function is touched on the touch-control display device.

2. The method as claimed in claim 1, wherein the computer system comprises a plurality of data storage devices, and the data storage device storing the first operating system is different from the data storage device storing the touch-control display device driver, the position detector driver, the navigation program, and the map image file.

3. The method as claimed in claim 1, wherein the computer system comprises a plurality of data storage devices; at least one of the programs, including the touch-control display device driver, the position detector driver, the navigation program, and the map image file, is stored in the data storage device which also stores the first operating system, and the other application are stored in the data storage device different from the data storage device storing the first operating system.

4. The method as claimed in claim 1, wherein:
   the computer system further comprises at least one audiovisual player, and the data storage device stores at least one audiovisual player application program corresponding to the audiovisual player; and
   the step (c3) further comprising the step of displaying at least one executive item icon representing the audiovisual player application program, in which the executive item icon representing the audiovisual player application program is for executing a procedure for loading and executing the first operating system, executing the audiovisual player application program, and activating and playing the audiovisual player.

5. The method as claimed in claim 4, wherein the step (c1) further comprises a step of detecting the audiovisual player.

6. The method as claimed in claim 1, further comprising a step between the step (c1) and step (c2) of loading and executing a boot-loader program stored in the main boot record sector of the data storage device.

7. A method for express execution of navigation function with a touch-control interface for a computer system, comprising the following steps of:
   (a) turning on the computer system;
      wherein the computer system is arranged such that the computer system at least includes a data storage device, a system memory, a BIOS, a touch-control display device, and a position detector; and the data storage device stores a first operating system, a second operating system, a navigation program, and a map image file;
   (b) executing the BIOS of the computer system;

(c) before loading and executing the first operating system or the second operating system, performing the steps of:
  (c1) displaying an executive item icon representing a navigation function and another executive item icon representing a regular booting process with the touch-control display device;
    wherein the executive item icon representing the navigation function is for executing a procedure for loading and executing the first operation system, activating the position detector to determine a current position of the computer system, and loading and executing the navigation program to map the current position to the map image file; and
    wherein the executive item icon representing the regular computer booting process is for executing a procedure for loading and executing the second operating system;
  (c2) determining which among the displayed executive item icons is selected by the touch-control display device; and
  (c3) executing the procedure corresponding to the selected executive item icon.

8. The method as claimed in claim 7, wherein the computer system comprises a plurality of data storage devices, and the first operating system and the second operating are stored in different data storage devices respectively.

9. The method as claimed in claim 7, wherein:
the computer system further comprises at least one audiovisual player, and the data storage device stores at least one audiovisual player application program corresponding to the audiovisual player; and
the step (c1) further comprising the step of displaying at least one executive item icon representing the audiovisual player application program, in which the executive item icon representing the audiovisual player application program is for executing a procedure for loading and executing the first operating system, executing the audiovisual player application program, and activating and playing the audiovisual player.

10. The method as claimed in claim 9, wherein in step (c1), the computer system further comprises a plurality of audiovisual players and the executive item icons representing the audiovisual player application programs are categorized into one executive item group, and the step (c1) further comprises the steps of:
displaying the executive item icon representing the navigation function, the group icon representing the executive item group of the audiovisual player application program, and the executive item icon representing the regular computer booting process with the touch-control display device;
determining which among the displayed executive item icons and the group icon is selected by the touch-control display device; and
executing the procedure corresponding to the selected executive item icon when the executive item icon representing the regular computer booting process or the navigation function is selected; or displaying the executive item icons of the audiovisual player application program when the group icon of audiovisual player application program is selected.

11. A computer system for express execution of navigation function, comprising:
a control circuit;
a BIOS memory, connected to the control circuit and storing a BIOS program;
a system memory, connected to the control circuit;
a touch-control display device, connected to the control circuit, for sending an input signal to the control circuit and receiving visual signals generated by the control circuit for displaying;
a position detector, connected to the control circuit for determining the current position of the computer system; and
at least one data storage device, storing a first operating system, a touch-control display device driver for activating the touch-control display device, a position detector driver for activating the position detector, a navigation program, and a map image file;
wherein the computer system is arranged such that after the computer system is turned on, the touch-control display device displays an executive item icon representing the navigation function before loading and executing the first operating system;
the control circuit determines whether the executive item icon representing the navigation function is selected according to the input signal sent by the touch-control display device before loading and executing the first operating system; and
after the executive item icon representing the navigation function is selected, the control circuit loads and executes the first operating system, loads and executes the position detector driver for activating the position detector to determine a current position of the computer system, and loads and executes the navigation program to map the current position to the map image file.

12. The computer system as claimed in claim 11, wherein the touch-control display device includes:
a display panel, for receiving the visual signals generated by the control circuit for displaying; and
an touch-control signal receiver, disposed on the display panel, and connected to the control circuit, for sending the input signal to the control circuit.

13. The computer system as claimed in claim 11, wherein the computer system comprises a plurality of data storage devices, and the data storage device storing the first operating system is different from the data storage device storing the touch-control display device driver, the position detector driver, the navigation program, and the map image file.

14. The computer system as claimed in claim 11, wherein the computer system comprises a plurality of data storage devices; at least one of the programs, including the touch-control display device driver, the position detector driver, the navigation program, and the map image file, is stored in the data storage device which also stores the first operating system, and the other applications are stored in a data storage device different from the data storage device storing the first operating system.

15. The computer system as claimed in claim 11 wherein:
the data storage device further stores a second operating system;
the touch-control display device further displays an executive item icon representing a regular computer booting process of the second operating system; and
the control circuit loads and executes the second operating system when the executive item icon representing the regular computer booting process is selected.

16. The computer system as claimed in claim 15, wherein the computer system comprises a plurality of data storage devices, and the data storage device storing the first operating system is different from the data storage device storing the second operating system.

17. The computer system as claimed in claim 15, wherein the data storage device is configured to comprise a first partition and a second partition, and the first operating system and the second operating system are stored in the first partition and the second partition respectively.

18. The computer system as claimed in claim 11, further comprising:
   at least an audiovisual player, connected to the control circuit; and
   at least one audiovisual player application program, stored in the data storage device;
   wherein the touch-control display device further displays an executive item icon representing the audiovisual player application program, and the control circuit loads and executes the first operating system, activates the audiovisual player, and loads and executes the audiovisual player application program when the executive item icon representing the audiovisual player application program is selected.

* * * * *